United States Patent

Capanna

[15] 3,635,320
[45] Jan. 18, 1972

[54] CLUTCH FLYWHEEL

[72] Inventor: Anthony Capanna, 209 Via Colusa, Palos Verdes Estates, Calif. 90274

[22] Filed: Dec. 31, 1969

[21] Appl. No.: 889,633

[52] U.S. Cl..........................................192/107 M, 74/572
[51] Int. Cl......................................................F16d 13/60
[58] Field of Search..............74/572, 574; 193/107 M, 70.13

[56] References Cited

UNITED STATES PATENTS

| 1,318,302 | 10/1919 | Sperry | 74/572 |
| 1,365,473 | 1/1921 | Emmet | 74/572 |
| 1,645,268 | 10/1927 | Walker | 74/572 |
| 2,539,730 | 1/1951 | Defosse | 74/572 |
| 2,719,438 | 10/1955 | Schiefer | 192/107 M |
| 2,890,777 | 6/1959 | Weiland | 192/70.13 |

Primary Examiner—Benjamin W. Wyche
Assistant Examiner—Warren Olsen
Attorney—Robert R. Meads

[57] ABSTRACT

A bimetal flywheel for clutches including a steel inner disc and an outer aluminum ring secured together by interlock means, the steel disc including a smooth radial surface for bearing against a disc of a clutch assembly and the outer ring being adapted to carry a cover for the clutch assembly, and the interlock means opposing separation of the inner disc and outer ring as the disc presses against the radial face when the associated clutch is engaged.

4 Claims, 4 Drawing Figures

PATENTED JAN 18 1972 3,635,320

INVENTOR.
ANTHONY CAPANNA
BY Robert R Meads
ATTORNEY

CLUTCH FLYWHEEL

The present invention relates to improvements in automotive clutches and the like, and, more particularly, to a novel flywheel construction particularly useful in such clutches.

It is particularly important that racing cars have the capability of rapidly accelerating and decelerating. Accordingly, it is desirable to reduce the mass and hence the inertia of all rotating and reciprocating parts in and associated with racing cars engines. This is particularly true of the flywheels included in the clutch assemblies of racing cars having manual shift transmissions. This desire has led to the development of aluminum flywheels. While such flywheels are lightweight and thus able to be rapidly accelerated and decelerated, the clutch pad engaging surfaces unfortunately have very poor wear characteristics and the flywheels tend to warp. In an attempt to counteract such wear problems, metal plates have been bonded to the radial faces of aluminum flywheels and in other instances the radial faces have been sprayed with a metallic material. Neither of these proposals have proven successful. The metal plates rapidly curl, separate from the flywheel, and produce undesired excessive wear on the associated clutch pads. The spray coatings rapidly wear off.

It is therefore an object of the present invention to provide a unique clutch flywheel which is capable of being rapidly accelerated and decelerated and yet is so constructed as to resist warpage and to provide clutch disc engaging surfaces having high, uniform wear characteristics.

Another object of the invention is to provide a flywheel of the foregoing character comprising a central disc of a strong, sturdy, wear resistant material surrounded by an outer ring of a lightweight metal with interlocking means therebetween which prevents separation of the inner disc and outer ring during engagement and disengagement of the clutch.

A further object of the present invention is to provide a flywheel of the foregoing character including interlocking means comprising mating annular shoulders on an outer periphery of the inner disc and an inner surface of the outer ring.

The foregoing as well as other objects and advantages of the present invention may be more clearly understood by reference to the following detailed description when considered with the drawing, which by way of example only illustrates a clutch including a flywheel including the features of the present invention.

Figure 1:
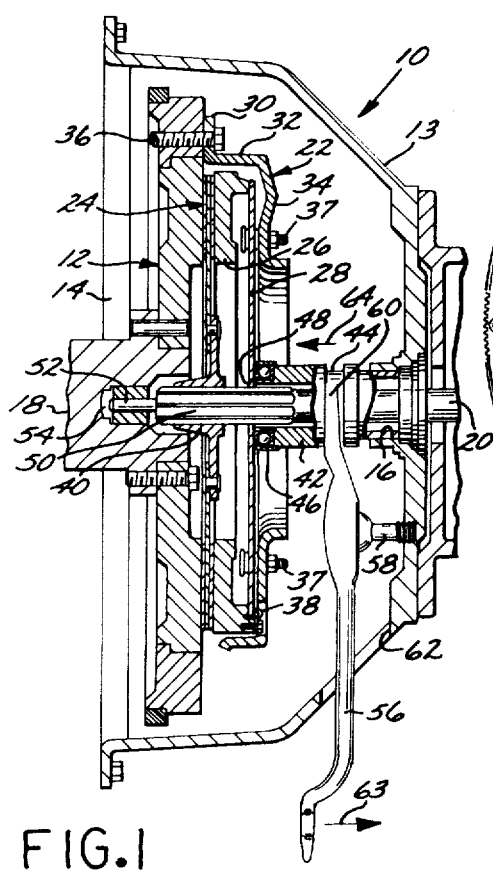
FIG. 1 is a sectional side view of an automobile clutch including the flywheel having the features of the present invention.

FIG. 1 illustrates a clutch assembly 10 for an automobile including one form of the flywheel 12 of the present invention. But for the structure of the flywheel, the clutch assembly is of conventional design. Therefore, the assembly will be described only briefly and to the extent necessary to understand the function of the flywheel in a clutch assembly.

As illustrated, the clutch assembly 10 includes an outer housing 13 of generally bell-shaped construction having coaxial and opposing openings 14 and 16 for receiving an engine crankshaft 18 and a transmission shaft 20, respectively. Within the outer housing 13, the clutch assembly 10 includes the flywheel 12, inner cover member 22, clutch disc 24, pressure plate 26, and spring plate 28. Generally speaking, with the clutch engaged, as illustrated, rotational motion of the crankshaft 18 is transferred to the transmission shaft 20 by the clutch disc 24 rotating with the flywheel 12.

More particularly, the flywheel 12 is generally disc-shaped and is bolted or otherwise secured to the end of the crankshaft 18 within the outer housing. The inner cover member 22 includes an outer radial flange 30, an annular portion 32 extending axially from the flange, and a generally radial flange 34 extending inwardly from a right end of the annular portion. The radial flange 30 is secured by bolts 36 to the right face of the flywheel 12 adjacent its peripheral edge. The spring plate 28 is secured by bolts 37 to the inner radial flange 34 within the inner cover member 22 and is adapted for flexing in an axial direction relative to the crank and transmission shafts. The pressure plate 26 is coupled to the spring plate 28 by a plurality of retainer springs, one of which is illustrated at 38, and is coaxially oriented within the inner cover member 22 between the spring plate and the clutch disc 24. The clutch disc 24, in turn, is secured to a female spline 40 and is captured between the pressure plate and the right face of the flywheel 12.

The clutch assembly 10 as described is coupled to the transmission shaft 20 through the female spline 40. In this regard the transmission shaft 20 carries a collar 42 including an annular groove 44. The collar is adapted to slide on the transmission shaft 20 up against a throwout bearing 46 which, in turn, bears against the spring plate 28. The spring plate 48 includes a central opening 48 for receiving a male spline 50 on the end of the transmission shaft. The male spline 50 mates with the female spline 40 and carries a coaxial pin 52 on its forward end which is bearing supported in a cavity 54 in the end of the crankshaft 18. The pin and its associated bearing provide end and centering support for the transmission shaft 20 within the clutch assembly. Thus arranged, rotation of the clutch disc 24 and female spline 40 with the flywheel 12 produces a like rotation of the transmission shaft 20.

Engagement and disengagement of the clutch assembly and hence operation thereof is controlled by an arm 56 pivoted at 58 to the right end of the outer housing 13. The end of the arm 56 within the housing includes a finger 60 riding in the annular slot 44 of the collar 42. The outer end of the arm 56 extends beyond the outer housing through a slot 62 for connection to the clutch pedal within the vehicle associated with the clutch assembly.

As illustrated, the clutch assembly 10 is normally engaged. In such a condition, the flywheel 12 continuously rotates with the crankshaft 18 to turn with it the inner cover member 22 and spring plate 28. The spring plate 28 bears tightly against the pressure plate 26 and urges the pressure plate to the left toward the disc 24. The disc, in turn, is urged tightly against the right radial face to the flywheel 12 to cause the disc to rotate with the flywheel. As the disc rotates, it turns in a like manner the female spline 40 to drive the transmission shaft 20 through the male spline 50 on the end of the shaft.

When it is desired to disengage the clutch, the clutch pedal is depressed causing the arm 56 to move to the right as indicated by the arrow 63. This produces a movement of the collar 42 to the left, as indicated by the arrow 64. Movement of the collar 42 to the left forces the throwout bearing 46 in a like direction against the inner portion of the spring plate 28. This produces a deflection of the outer edge of the spring plate to the right and causes the pressure plate 26 to move slightly away from the disc 24. This allows the pad to slip relative to the flywheel 12 and halts the transfer of rotational energy from the crankshaft 18 to the transmission shaft 20.

When it is desired to reengage the clutch 10, the clutch pedal is let out. This causes the arm 56 to return to the position illustrated in FIG. 1 and restores the spring force of the plate 28 to the pressure plate 26 and hence to the disc 24. At this occurs, the disc 24 is again pressed tightly against the rotating flywheel 12 to produce a turning of the transmission shaft 20 with the crankshaft 18.

From the foregoing description of the structure and operation of the clutch assembly 10, it should be apparent that the flywheel 12 plays a very important role in the efficient operation of the clutch. It is important that the right radial face of the clutch bearing against the disc 24 remain smooth and have a high-wear characteristic, if the clutch is to continue to operate efficiently. In addition, it is important that the flywheel not warp or become otherwise deformed and produce irregular wearing of the clutch pad. As previously described, it is also very important, particularly in racing cars, that the flywheel be of a light mass capable of being accelerated and decelerated rapidly.

To accomplish each of the foregoing and to overcome the disadvantage of prior lightweight flywheels, the present invention contemplates a bimetal flywheel construction wherein a central inner portion of the flywheel is formed of a strong metal having high-wear characteristics surrounded by an outer ring of a lightweight metal. The combination provides a flywheel having all of the foregoing desired characteristics with none of the disadvantages previously encountered in all aluminum flywheels and modifications thereof.

Figure 2:
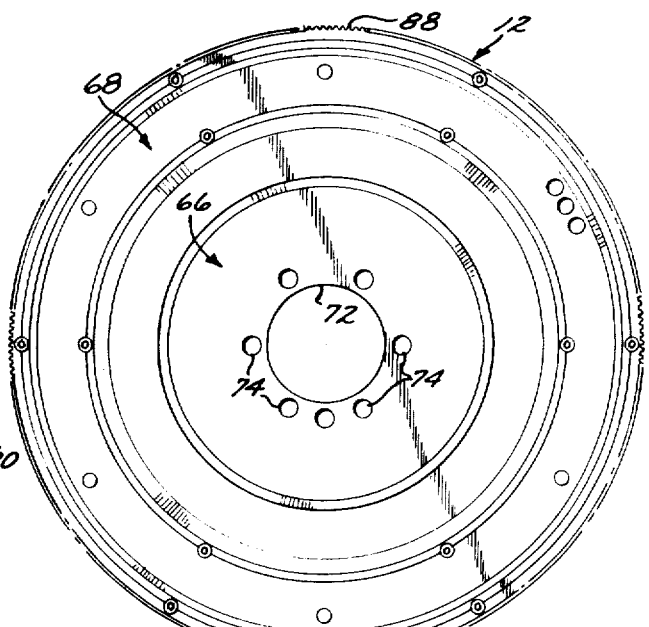
FIG. 2 is a rear view of the flywheel.
Figure 4:
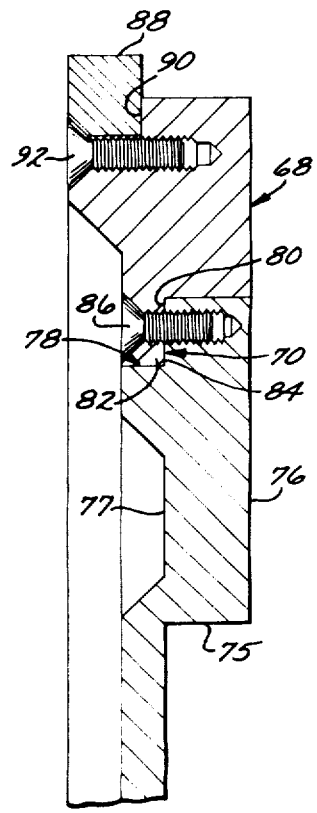
FIG. 4 is a fragmentary sectional view of an outer peripheral portion of the flywheel illustrating the interlock between the inner central disc and the outer ring comprising the flywheel.
Figure 3:
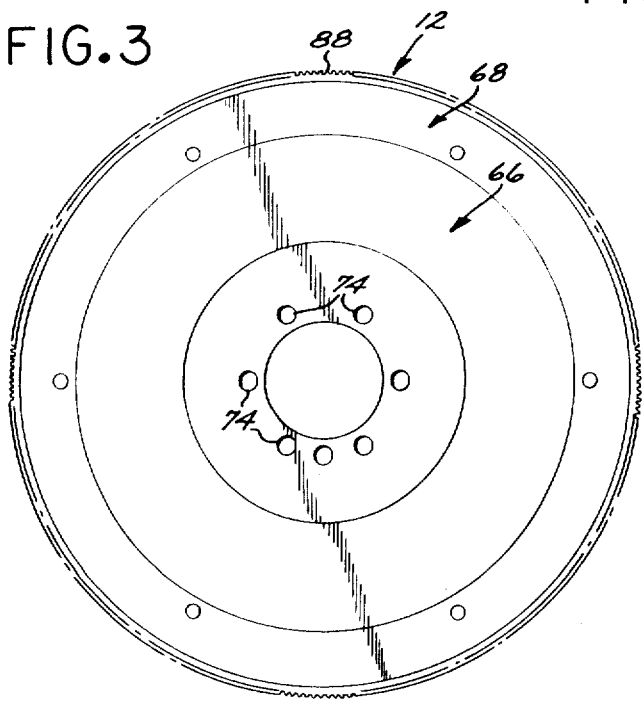
FIG. 3 is a front view of the flywheel.

Accordingly, as depicted in FIGS. 2, 3, and 4, the flywheel 12 of the present invention includes an inner disc 66 preferably formed of steel, surrounded by an outer ring 68 of a lightweight metal, preferably aluminum, and secured thereto by interlock means 70. The inner disc 66 includes an opening 72 for receiving the end of the crankshaft 18 and is surrounded by a plurality of equally spaced holes 74 for receiving the bolts that secure the flywheel to the crankshaft. A central portion on the right side of the inner disc 66 is axially relieved at 75 to reduce the weight of the flywheel. The outer radial portion of the right side is flat and defines the radial surface 76 for engaging the clutch pad, as illustrated in FIG. 1. The left side of the inner disc 66 is also axially relieved by an annular slot 77 to further reduce the weight of the flywheel.

As mentioned, the outer ring 68 is formed of a lightweight metal, preferably aluminum. It is secured to the inner disc 66 first by heating the outer ring until it expands to an inner diameter slightly larger than the outer diameter of the disc. The ring is then slipped over the periphery of the inner disc and allowed to cool and become tightly secured to the disc. The interlock means 70 further improve the tight connection between the inner disc and outer ring.

In this regard, the interlock means 70 is adapted to (1) resist separation of the inner disc 66 and outer ring 68 when pressure is applied through the clutch disc 24 against the radial surface 76 of the disc and (2) to resist separation of the inner disc and outer ring when the clutch assembly is disengaged. To accomplish this, the preferred form of the interlock means 70, illustrated in FIG. 4, includes an annular slot 78 in the periphery of the inner disc 66 at the left side thereof defining a step having a vertical shoulder 80. An annular projection 82 extends radially inward from the inner surface of the outer ring 68 and mates with the annular slot 78 to nest tightly therein with a vertical shoulder 84 bearing tightly against the vertical shoulder 80. Thus arranged, pressure of the clutch disc 24 against the radial surface 76 of the inner disc 66 is opposed by the shoulders bearing against each other to more tightly secure the inner disc and outer ring together thereby resisting separation of the component parts of the flywheel while the clutch assembly is engaged.

The interlock means 70 further includes a plurality of screws 86 extending axially (parallel to the crankshaft) through the projection 82 and into the inner disc 66 through the shoulder 80. The screws 86 function to resist separation of the inner disc 66 and outer ring 68 when the clutch is disengaged. Under such conditions, a reaction force to the right is exerted on the inner disc and a reaction force to the left is exerted on the outer ring. The screws resist such forces and insure against separation of the component part of the flywheel as the clutch is being disengaged.

You will note from FIG. 1 that the outer ring 68 is adapted to support the inner cover member 22 of the clutch assembly by bolts extending therethrough and through the outer radial flange 30. Also, the outer ring 68 is adapted to carry a ring gear 88 associated with the starter for the engine. The balance of the starter is not illustrated but extends into the outer case with a gear mating with the rear gear. In this regard, the ring gear 88 nests tightly in an annular slot 90 in the outer surface of the ring 68 and is held in place by the ends of screws 92 extending axially into the outer ring as illustrated in FIG. 4.

During operation of a clutch assembly illustrated in FIG. 1, the inner steel disc 66 resists wear and warpage and maintains a smooth friction surface 76 for engaging the clutch disc 24 over long periods of time. The outer ring 68 being aluminum is light weight. Hence the major portion of the flywheel and that displaced from the crankshaft is of low mass. This enables the flywheel 12 to be rapidly accelerated and decelerated. Accordingly, the flywheel 12 possesses all the advantages sought for a low-mass flywheel with none of its attendant disadvantages.

I claim:

1. A A clutch flywheel comprising:
   an inner disc of a relatively heavy, hard metallic material adapted for connection to an end of and for rotation with an engine crankshaft and defining an inner central core for said flywheel, said inner disc having an annular periphery and opposing radial faces comprising inner portions of opposite sides of said flywheel, one of said radial faces having a smooth annular portion for bearing against a clutch disc;
   an outer lightweight metal ring having an inner annular surface around said annular periphery of said inner disc; and
   interlock means on said annular inner surface and said annular periphery for locking together said inner disc and said outer ring.

2. The flywheel of claim 1 wherein said interlock means comprise a slot in said periphery of said inner disc and a projection on said outer ring nesting tightly in said slot and said slot and said projection having mating shoulders for bearing against each other and opposing separation of said inner disc and said outer ring with pressure of said clutch disc against said annular portion of said radial face.

3. The flywheel of claim 2 wherein said interlock means further includes screw means extending through said projection into said inner disc.

4. The flywheel of claim 1 wherein said interlock means comprises an annular slot in said periphery of said inner disc open at a side thereof opposite said one radial face to define a step in said periphery having a radial shoulder and an axial base and an annular projection from said inner annular surface of said outer ring tightly engaging said axial base and including a shoulder mating with said radial shoulder to oppose separation of said outer ring as said clutch disc presses against said annular portion of said radial face.

* * * * *